United States Patent [19]

Pippert

[11] 4,214,761
[45] Jul. 29, 1980

[54] PACKING CONSTRUCTION
[75] Inventor: Aaron J. Pippert, Houston, Tex.
[73] Assignee: Utex Industries, Inc., Houston, Tex.
[21] Appl. No.: 929,665
[22] Filed: Jul. 31, 1978
[51] Int. Cl.² .................... F16J 15/10; F16J 15/22
[52] U.S. Cl. .................... 277/123; 277/204; 277/205; 277/230; 277/233
[58] Field of Search .................... 277/123–125, 277/205, 206 R, 227–233, DIG. 6

[56] References Cited
U.S. PATENT DOCUMENTS

| 899,429 | 9/1908 | Noyes | 277/233 |
|---|---|---|---|
| 1,888,410 | 11/1932 | Schacht | 277/227 X |
| 2,538,198 | 1/1951 | Hosford | 277/227 X |
| 2,676,823 | 4/1954 | Olson et al. | 277/204 |
| 3,104,883 | 9/1963 | English et al. | 277/205 |
| 3,519,282 | 7/1970 | Davis | 277/230 |
| 3,627,337 | 12/1971 | Pippert | 277/206 X |

FOREIGN PATENT DOCUMENTS 2039071  2/1972  Fed. Rep. of Germany ........... 277/123

Primary Examiner—Robert S. Ward, Jr.
Attorney, Agent, or Firm—Browning, Bushman & Zamecki

[57] ABSTRACT

A seal or packing member, in annular or elongate strip form, the packing member having at least a partially layered construction comprised of at least one layer of a fabric-type material and another layer comprised of a binder having a fibrous filler generally uniformly disposed therein, the fibers of the filler being randomly oriented, the layers being bonded to one another.

9 Claims, 9 Drawing Figures

PACKING CONSTRUCTION

BACKGROUND OF THE INVENTION

The present invention relates to sealing devices and more particularly to seals, packings and wipers which are used to seal between two elements of an assembly which may be stationary or relatively moving.

It is common practice in the manufacture of composition packings or seals, both with and without a sealing lip(s), to construct the seal or packing from laminations or layers of suitable fabric materials superimposed upon one another and bonded together in a suitable fashion by means of thermosetting or thermoplastic resins. Typically, a fabric such as, for example, cotton, linen, nylon or the like, which is impregnated with a suitable resinous material, which can be either thermoplastic or thermosetting in nature, and the thus impregnated fabric is layered or laminated to the desired dimensions. The laminations are bonded together by means of pressure and temperature, the packing or seal being generally made into the desired configuration, e.g. with a sealing lip, at that time. U.S. Pat. No. 3,627,337 shows a laminated type packing comprised of alternating laminations of fibrous thermoplastic and fibrous thermosetting materials bonded together, molded and cured to the desired cross-sectional shape, the thermoplastic and thermosetting materials each being impregnated with a resinous compound which will mold to the desired shape and bond the laminations together.

It is also known in the manufacture of composition packings or seals to add particulate fillers to the impregnating compound used to bond the laminations together. Thus, fillers such as carbon black, graphite, clays, etc. are used to enhance the wear resistance, achieve lower friction, increase abrasion resistance, etc. The use of such particulate fillers does not always overcome the limitations imposed on the seal by the service conditions in which the packing or seal is placed because of the physical limitations inherent in the fabric used. Thus, for example, although a packing employing a cotton fabric and particulate carbon black as a filler may have higher heat resistance than a packing comprised of cotton alone, it may suffer from lower tensile strength.

Attempts have been made to construct composition packings or seals which will overcome some of the disadvantages discussed above in the use of particulate fillers. U.S. Pat. No. 3,879,044 to Estes discloses an O-ring construction in which a fluoroelastomeric sealant is combined with non-woven, radially oriented fibers, the fibers being disposed such that a least 25% form an angle of no more than 30° from radii drawn through the center and through the plane of the sealant. The seal of the Estes patent is a substantially homogeneous seal in which the short fibers are dispersed, in oriented fashion, in the fluoroelastomeric sealants.

U.S. Pat. No. 3,873,168 to Viola et al discloses a laminated, annular article constructed from layers of woven glass and layers of woven graphite, the layers being impregnated with a suitable resin and bonded together to form the article. The article disclosed in the Viola et al patent, employing as it does woven graphite or woven carbon fibers, is relatively expensive to manufacture.

U.S. Pat. No. 3,901,517 to Heathcott discloses a dynamic seal which employs a relatively thin biasing section, and in which the biasing section of the seal may be comprised of a thermosetting or thermoplastic material reinforced with a fibrous material which can be in the form of a cloth or as a chopped or flocked filler.

SUMMARY OF THE INVENTION

It is therefore an object of the present invention to provide an improved composition seal or packing.

It is further an object of the present invention to provide an improved composition seal or packing employing a layered construction.

The above and other objects of the present invention will become apparent from the drawing, the description given herein and the appended claims.

The packing or seal of the present invention, in one form, comprises an annular body, at least a portion of which has a layered construction. The layered construction comprises at least one layer of a fabric type material, e.g. a woven material, and at least one layer comprised of a binder having disposed therein, a fibrous filler, the filler being generally uniformly distributed in the binder, the fibers of the filler being randomly oriented therein. The layers are bonded together utilizing the binder or a suitable impregnating agent which is used to impregnate the fabric.

In another form, the invention provides an elongate strip packing member which has the composition and construction described above for the annular packing member, but which can be cut to desired lengths and formed into annular seals of the desired size.

DESCRIPTION OF THE PREFERRED EMBODIMENTS

Figure 1:
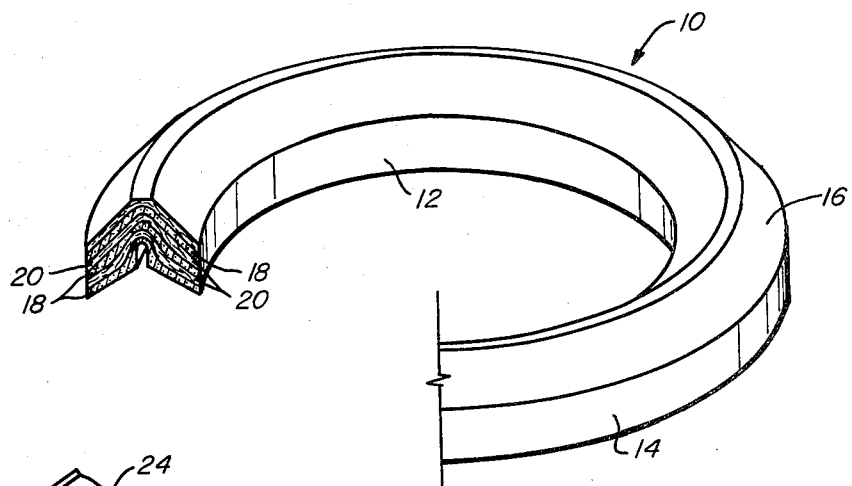
FIG. 1 is an isometric, cross-sectional view of one form of a packing or seal employing the packing construction of the present invention.

Referring first to FIG. 1, there is shown an annular packing 10, commonly referred to as a V-ring, having dual radial sealing lips 12 and 14, lip 12 forming a radially innermost lip seal and lip 14 forming a radially outermost lip seal. The body 16 of packing 10 is laminated and is formed by alternating layers 18 and 20 bonded together. Layers 18 are comprised of a binder having uniformly disposed therein a fibrous filler, the fibers of the filler being randomly oriented in the binder. Layers 20 are comprised of a fabric material such as for example a woven natural or synthetic material.

Figure 2:
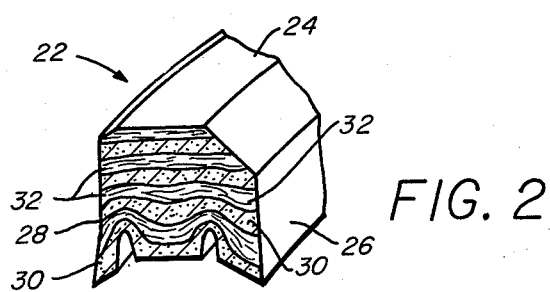
FIG. 2 is a cross-sectional view of a double-lip type seal employing the construction of the present invention.

In FIG. 2 there is shown a double lip-type packing 22. Packing 22 is comprised of annular body 24 provided with radially innermost and radially outermost sealing lips 26 and 28, respectively. Packing 22, like packing 10 shown in FIG. 1, is of laminate construction comprised of alternating layers 30 and 32 bonded together. Layers 30 are comprised of a binder having disposed therein a suitable fibrous filler, the fibers of which are generally uniformly disposed and randomly oriented in the binder. Layers 32 are comprised of a suitable fabric, e.g. a woven material, which may or may not be impregnated with a thermosetting or thermoplastic material.

Figure 3:
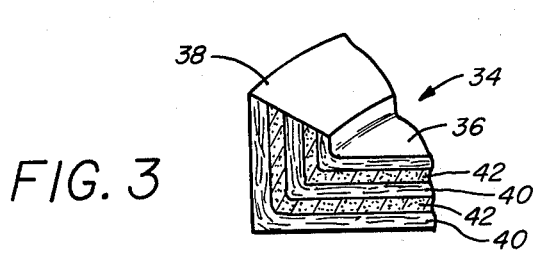
FIG. 3 is a cross-sectional view of a cup-type seal employing the packing construction of the present invention.

FIG. 3 shows a cup packing 34 having a body section 36 provided with a radially outermost lip 38. Cup packing 34 is formed by alternating layers 40 and 42, layers 40 being comprised of a fabric-like material, layers 42 being comprised of a binder having a fibrous filler disposed therein.

In the embodiment shown in FIGS. 1 and 2, the edges of the laminations or layers are exposed to the bearing or sealing surfaces of the parts between which the packings are disposed. Thus, both the fabric layers and the layers comprised of the binder and fibrous filler are disposed to such surfaces. In the cup packing shown in FIG. 3, only a fabric layer 40 is exposed to the bearing or sealing surface. It will be recognized that, depending upon the environment in which cup packing 34 is used, it may be preferable to construct the packing such that the layer comprised of the binder and fibrous material, i.e. layer 42, is exposed to the bearing or sealing surface.

Figure 4:
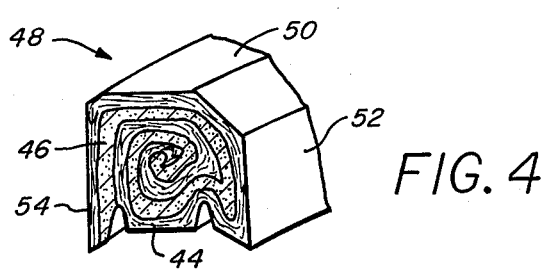
FIG. 4 is similar to FIG. 2 and shows another form of the packing construction of the present invention.
Figure 9:
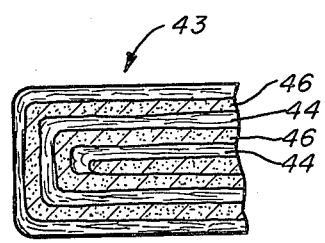
FIG. 9 is a cross-sectional view of still another form of the packing construction of the present invention.

With reference now to FIGS. 4 and 9, there is shown a double lip seal, similar to that shown in FIG. 2, but of the so-called rolled construction rather than of the laminated construction like the packing shown in FIG. 2. Referring first to FIG. 9, there is shown a blank comprised of layers 44 and 46, layer 44 being comprised of a fabric, e.g. a woven material, layer 46 being comprised of a binder and a suitable fibrous filler. In forming blank 43 a strip of the fabric used to form layer 44 is covered with a layer comprised of the binder and the fibrous filler. The dual layered strip is then rolled until the desired cross-sectional dimensions are obtained with the result that the layered construction shown in FIG. 9 is achieved. It will be recognized that depending upon which way the dual layered strip is rolled, the fabric layer or the layer containing the binder and fibrous filler may form the outermost surface of the blank. Referring now to FIG. 4 there is shown a dual lip seal 48 which has been constructed from a blank similar to blank 43 shown in FIG. 9. Double lip seal 48 is of the same cross-sectional configuration as double lip seal 22 shown in FIG. 2. Double lip seal 48 has a body 50 provided with radially innermost and radially outermost sealing lips 52 and 54, respectively. Since packing 48 is formed from a blank similar to 43 shown in FIG. 9, the outer surface and hence both the sealing faces of lips 52 and 54 is formed by layer 44, i.e. the fabric layer, as opposed to the layer comprised of the binder and the fibrous filler.

Figure 5:
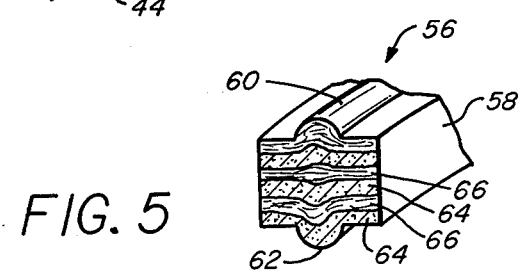
FIG. 5 shows a cross-sectional view of a seal without sealing lips and made in accordance with the packing construction of the present invention.

Referring now to FIG. 5 there is shown a packing or seal which does not employ sealing lips. Seal 56 has a body portion 58 which is provided with compression lobes 60 and 62. The body 58 of seal ring 56 is of a laminate construction comprised of layers 64 and 66, layer 64 being comprised of a binder and suitable fibrous filler, layer 66 being a fabric layer. It will be readily recognized that seal 56, while different in configuration and hence in application, is constructed in the same manner as double lip seal 22 and cup seal 34.

Figure 6:
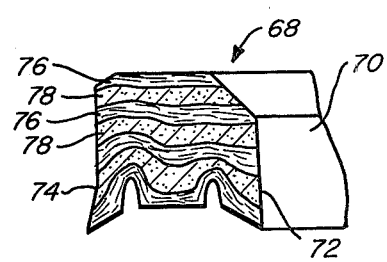
FIG. 6 is an isometric, cross-sectional view of an elongate strip packing member employing the packing construction of the present invention.

In FIG. 6 there is shown an embodiment wherein the packing or seal is in the form of an elongate strip 68. Strip 68 has a body portion 70 and lip seals 72 and 74. Body 70 is of laminate construction and is comprised of layers 76 and 78, layers 76 being the fabric layers, layer 78 being the layers comprised of the binder and fibrous filler. As seen, layers 76 and 78 are superimposed upon one another and bonded together. It will be recognized that the double lip seal shown in FIG. 6 is identical in cross-sectional shape to double lip seal 22 shown in FIG. 2. However, while packing 22 is in the form of an annular member, packing 68 is in the form of an elongate strip which can be cut to desired lengths and then formed into annular packings of the desired size.

Figure 7:
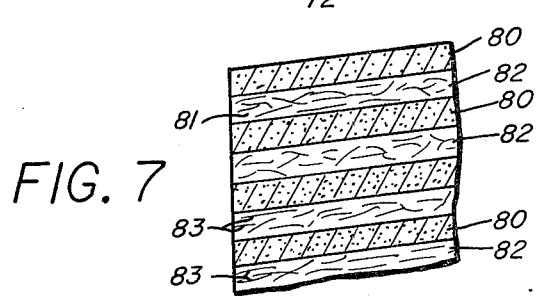
FIG. 7 is an enlarged, cross-sectional view of one form of the packing construction of the present invention.
Figure 8:
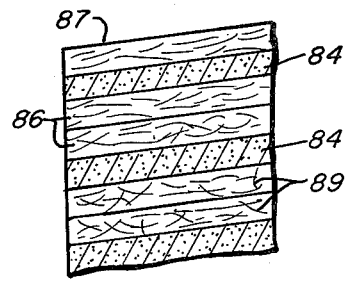
FIG. 8 is an enlarged, cross-sectional view of another form of the packing construction of the present invention.

FIG. 7 shows an enlarged, cross-sectional view of the layered packing construction of the present invention. In the embodiment shown in FIG. 7, there are layers 80 of a suitable fabric material, e.g. a woven material, and layers 82 comprised of the binder 81 and a suitable fibrous filler 83. In FIG. 8 there is shown a slightly different embodiment wherein there are two layers comprised of the binder and fibrous filler disposed between the layers formed by the fabric material. Thus, in the embodiment shown in FIG. 8 a fabric layer 84 is separated from the next closest fabric layer 84 by two layers 86 comprised of the binder 87 and the fibrous filler 89. The packing construction shown in FIG. 8 would be prepared by taking a fabric layer 84 and placing a layer comprised of the binder and the fibrous filler on each side of fabric 84. Thus, when the blank or packing was built-up, there would be two layers comprised of the binder and the fibrous filler between the adjacent fabric layers.

It will be apparent that the layers 86 shown in FIG. 8 can be the same or different. Thus, for example, one side of layer 84 could be provided with a layer of a binder and a suitable fibrous filler and the other side of layer 84 could be provided with a layer of a different binder and/or different fibrous filler. This permit great latitude in tailoring the seal to accommodate widely varying conditions of temperature, pressure, resistant to chemical degradation, etc. It will also be appreciated that various combinations of fabric layers can be used. Thus, for example, in the embodiment shown in FIG. 7, layers 80 could differ as to the type of fabric employed. Additionally, layers 82 could differ in that the binder and/or the fibrous fillers used in the individual layers could be different.

The fabric layer of the packings and seals of the present invention can be formed from materials which are woven, felted or otherwise formed into sheet-like or fabric-like structures. Accordingly, the term "fabric" is intended to include more than merely woven material. For example, felts are a form of fabric which are not necessarily obtained by conventional weaving processes. The term "woven fabric," as used herein, refers to any material obtained by weaving or other such techniques wherein the matrix consists of a lattice work or web of thread-like elements which are generally, uniformly oriented such as might be the case in certain felts. Generally speaking, woven fabrics are preferred. The fabric can comprise a thermoplastic material, a thermosetting material, a fabric reinforced thermosetting material, a fabric reinforced thermoplastic material, a mixed thermoplastic/thermosetting material or various combinations of the above. The term "thermosetting" as herein applies to those materials, generally, but not always, synthetic in nature, which solidify or set on heating and cannot readily be remelted. Non-limiting examples of such thermosetting materials or resins include phenolics, alkyds, amino resins, polyesters, epoxies, silicones and the like. The term "thermoplastic" as used herein applies to materials, generally, but not always, synthetic in nature, that may be softened by heat and then regain their original properties upon cooling. Non-limiting examples of such thermoplastic materials or resins include nylons, polyethylene, polypropylene, cellulose, and acrylic resins, polycarbonates and the like. Numerous other materials can be used in the fabric layer, such as for example, cotton, woven or felted asbestos, fiberglass, wool, silk, linen, rayon, and the like. Furthermore, blends of various materials such as cotton-polyester woven fabrics, rayon-polyester woven fabrics, etc. may also be employed.

As noted above, the fabric used to form the fabric layer is preferably impregnated with various thermosetting or thermoplastic materials or mixtures thereof to impart more desirable physical properties. Suitable impregnating materials include natural and synthetic rubbers, polychlorophrene, polystyrene, butadiene rubbers, styrene-acrylonitrile-butadiene rubbers, fluoroelastomers such as copolymers of vinylidene chloride and hexafluoropropolyene, acrylic elastomers such as those prepared from esters of acrylic acid, silicone rubbers, polyurethanes, epoxies, phenol-formaldehyde based resins and the like.

The binder used and which forms a part of the fibrous filler layer can be any of the above materials named as impregnating agents for the fabric layer. Indeed, the binder may serve both as a component of the fibrous filler layer and as an impregnating agent for the fabric layer.

The fibrous filler used in the packings and seals of the present invention can be made from virtually any material which can be formed into a fiber. Generally speaking, the fibrous filler is a non-compacted, aggregation of discrete strands or fibers having a length generally, but not always, too short to be formed into a flat, cloth-like or woven fabric, but nonetheless having the characteristics of a fiber as opposed to a particulate material, e.g. usually the majority of the individual elements of the floc or fibrous material have a length to diameter ratio (L/D) of >1. Such fibrous fillers or flocs can be obtained by chopping longer strands or fibers of the desired material, e.g. a chopped yarn. The individual fibers or strands of the fibrous material, which can be extremely short in length, are generally uniformly dispersed or distributed but randomly oriented in the binder. Thus, the binder/fibrous filler layer is a homogenous composition to the extent that the fibrous filler is generally uniformly dispersed in the binder. Numerous materials can be used in forming the fibrous fillers of the present invention. Non-limiting examples include fibrous fillers formed from: synthetic fibers of thermosetting and thermoplastic materials such as nylons, polyesters, acrylics, etc.; natural fibers such as cotton fibers, linen fibers, silk fibers, etc.; metallic fibers such as brass fibers, steel fibers, copper fibers, lead fibers; inorganic fibers such as asbestos fibers, silica fibers, glass fibers; graphite fibers, carbon fibers, alumina based fibers, etc. It will also be appreciated that mixtures of fibrous fillers can be employed such as for example, a mixture formed from nylon fibers and graphite fibers.

The seals and packings of the present invention can be manufactured by laminating, rolling, folding or any other technique in which the layered construction described above can be achieved. In manufacturing the packing and seals of the present invention several techniques can be employed. The fibrous filler and binder can be mixed together in a suitable fashion such as in a Banburry mixer, ball mill or the like and the resulting mixture calendered on the fabric layer. Alternately, the fabric layer can be treated with a tacky impregnating compound and the fibrous filler sprayed on the surface thereof. In this case, the impregnating compound serves as the binder. In still another method, the binder-fibrous filler mixture can be dispersed or dissolved in a suitable liquid carrier which can then be coated or sprayed onto the fabric layer until a desired thickness is achieved. The relative thicknesses of the fabric and the binder/fibrous filler layers will be determined by the types of materials employed, the use to which the packing or seal is to be put, etc. If the blank is to be formed by laminating, layers of the fabric and binder-fibrous filler are successively built-up and bonded together to form a blank which can then be molded to the desired configuration. Alternately, the laminations can be bonded and molded into the desired configuration of the packing at the same time. In the case of forming the blank by folding or rolling, individual layers are not formed as in the case of laminating. Rather, a fabric layer having disposed on one or both sides a binder-fibrous filler layer is either rolled in the manner described above with regard to FIG. 4 and 9 or is folded in accordian fashion in a manner well known in the art. In both cases, the layers formed by rolling and/or folding are bonded together and the desired configuration of the packing obtained by molding, or, as in the case of laminating, the rolls or folds are bonded and molded into the desired configuration at the same time.

It will be apparent that the composition packings and seals of the present invention are heterogeneous in nature to the extent that they are formed from what may be considered separate or discrete layers which have different compositions, e.g. a fabric layer and a binder/fibrous filler layer. However, the separate layers, are in themselves, generally homogenous in nature. Thus for example, the fabric layers which may for example be cotton impregnated with a thermosetting material, such as a phenolic resin, would be generally uniform in composition, and the layers comprised of the binder and fibrous filler would likewise be uniform in composition.

The use of the layered construction employing a fibrous filler described herein permits the manufacture of seals having all the advantages which could be obtained using woven fabrics or cloths made of the same materials as the fibrous filler without the attendant expense. For example, graphite cloth, i.e. woven graphite, is considerably more expensive than graphite floc or graphite fibrous filler, as that term is used therein.

It will be understood that the various configurations and materials of construction of the seals and packings is virtually endless. Accordingly, the configurations and materials of construction depicted in the drawings and described herein are merely illustrative and are not intended in any way to limit the scope of the invention either with regard as to the type of seal or the type of construction employed.

I claim:
1. A packing member comprising:

an annular body, at least a portion of which is layered, said layered portion having at least one layer comprised of fabric and another layer comprised of a binder having a fibrous filler generally uniformly disposed therein so as to form a generally homogeneous layer consisting of said filler and said binder, the fibers of said filler being randomly oriented, said layers being bonded to one another.

2. The packing member of claim 1 wherein said annular body is provided with at least one sealing lip.

3. The packing member of claim 1 wherein said annular body is provided with a plurality of sealing lips.

4. The packing member of claim 1 wherein said binder is selected from the class consisting of thermosetting and thermoplastic resinous materials and mixtures thereof.

5. The packing member of claim 1 wherein said fabric is a woven material.

6. The packing member of claim 1 wherein said fabric is selected from the class consisting of cotton, asbestos, fiberglass, nylons, polyesters, linens and mixtures thereof.

7. The packing member of claim 1 wherein said fabric filler comprises fibers of materials selected from the class consisting of thermosetting resins, thermoplastic resins, metals, graphite, carbon, asbestos, glass and mixtures thereof.

8. The packing member of claim 1 wherein said annular body is formed by alternating laminations of said fabric layer and said layer comprised of said binder and said fibrous filler.

9. The packing member of claim 1 wherein said fibrous filler comprises a non-compacted, aggregation of discrete fibers.

* * * * *